United States Patent
Buchele et al.

[15] 3,681,901
[45] Aug. 8, 1972

[54] CUTTING KNIFE ASSEMBLY FOR A COMBINE

[72] Inventors: Grame R. Quick; Wesley F. Buchele, both of Ames, Iowa

[73] Assignee: Iowa State University Research Foundation, Ames, Iowa

[22] Filed: March 8, 1971

[21] Appl. No.: 121,894

[52] U.S. Cl. ....................56/13.6, 56/14.5, 56/291
[51] Int. Cl. ..............................................A01d 47/00
[58] Field of Search............56/14.5, 14.6, 12.7, 13.6, 56/122, 154, 244, 245, 290, 291, 292

[56] References Cited

UNITED STATES PATENTS

| | | | |
|---|---|---|---|
| 3,503,190 | 3/1970 | Van Der Lely | 56/13.6 |
| 2,948,099 | 8/1960 | Johnson | 56/154 X |
| 2,745,236 | 5/1956 | Eskridge | 56/154 X |
| 1,760,939 | 6/1930 | Emerson | 56/290 |
| 3,034,276 | 5/1962 | Hester | 56/291 |

Primary Examiner—Louis G. Mancene
Assistant Examiner—J. N. Eskovitz
Attorney—Zarley, McKee & Thomte

[57] ABSTRACT

A cutting knife assembly for a combine having an elongated platform with an auger means rotatably mounted thereon. The auger means has first and second helical flighting sections extending inwardly from its ends which are adapted to convey the cut crop to the center of the platform. A first endless chain is operatively positioned forwardly of the first flighting section and has a plurality of first cutting elements mounted thereon. A second endless chain is operatively positioned forwardly of the second flighting section and has a plurality of second cutting elements mounted thereon. The first and second chains are operated in opposing directions so that the first and second cutting elements move away from the center of the platform as the cutting elements cut the standing crop. The opposing action of the cutting elements causes the crop stems to be properly oriented with respect to the flighting sections so that the stems will be inclined towards the center of the platform in the same direction as the auger feed.

9 Claims, 6 Drawing Figures

PATENTED AUG 8 1972  3,681,901
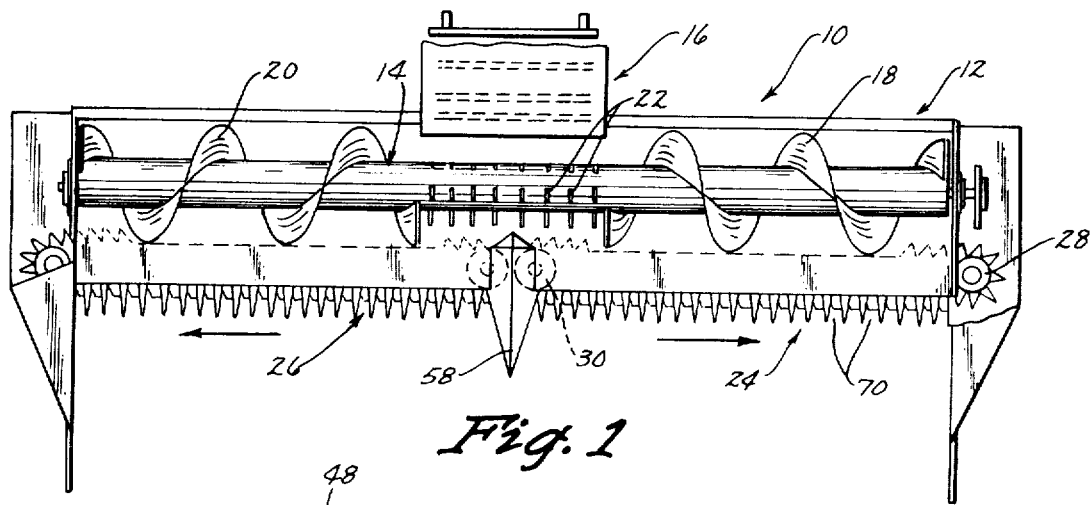
Fig. 1
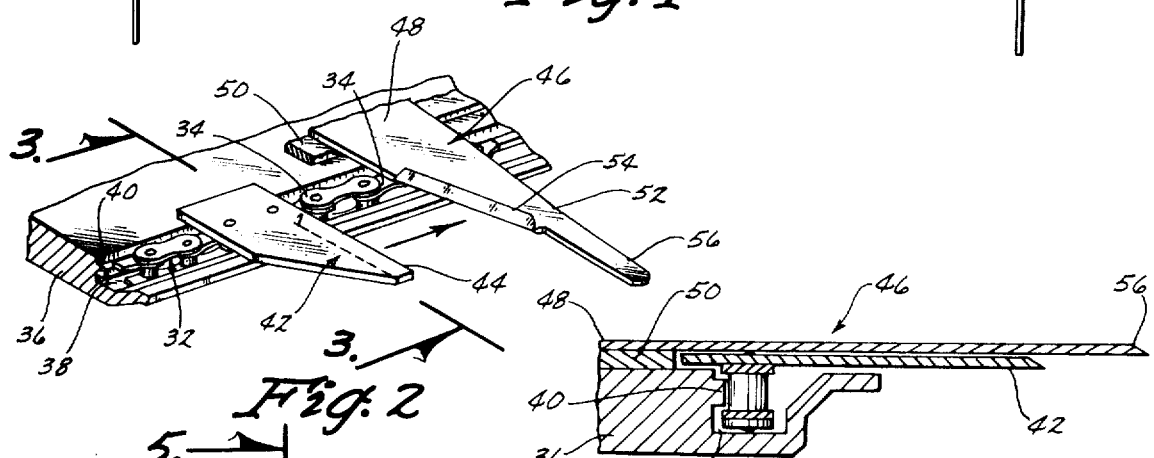
Fig. 2
Fig. 3
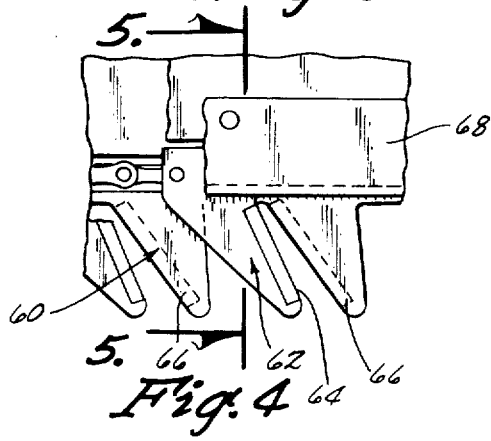
Fig. 4
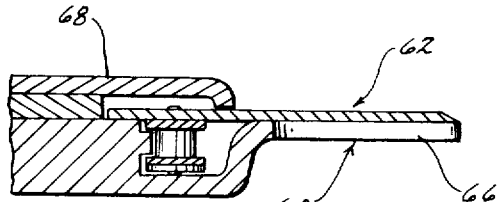
Fig. 5
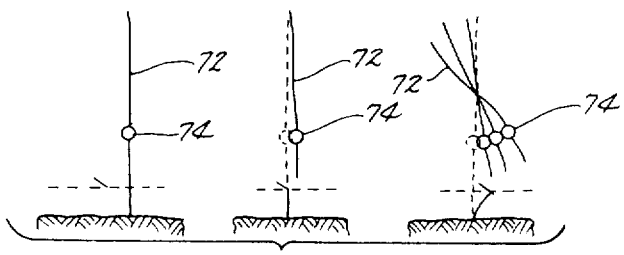
Fig. 6
INVENTORS
GRAEME R. QUICK
WESLEY F. BUCHELE
BY
*Jacon, McKee & Thomle*
ATTORNEYS

CUTTING KNIFE ASSEMBLY FOR A COMBINE

Harvesting losses due to conventional crop gathering mechanisms tend to be excessive during the harvesting of crops which bear the grain low to the ground such as soy beans and peas. It has been found that the cutter bar and feed auger are the primary causes of header losses. The conventional combine knife reciprocates through three inch center guards which causes the plants to be bent forwardly and sidewardly in a crowding action as the knife moves towards the ledger during low cutting operations. The sideward movement of the stems causes the plants to be inclined alternatively from left to right by the knife and then moved onto the platform by the reel. This random orientation is far from ideal since each gathering auger mounted just behind the knife and above the platform is designed to feed in only one direction, that is, towards the feed elevator. The net result is that some crop plants which are not in alignment with the auger may be thrust out of the header and bean pods may be shattered by the auger flights. Additionally, some stems are cut a second time by the knife. Further, stalk or stem slippage results along with pod stripping at the knife with a reciprocating cutter bar.

Therefore, it is a principal object of this invention to provide a cutting knife assembly for a combine.

A further object of this invention is to provide a cutting knife assembly for a combine having an auger means with opposing flighting at the ends thereof.

A further object of this invention is to provide a cutting knife assembly for a combine which includes a pair of opposing cutting chains which properly orients the stems as they are cut.

A further object of this invention is to provide a cutting knife assembly for a combine which prevents grain losses.

A further object of this invention is to provide a cutting knife assembly for a combine which causes the bottom of the stems to be displaced in the same direction as the knife travels so that after severance, the stem is inclined towards the center of the header or in the same direction as the auger feed.

A further object of this invention is to provide a cutting knife assembly for a combine which causes the combine to have improved thrashing and separating characteristics due to a more uniform and regular orientation of the crop passing through the machine from the header.

A further object of this invention is to provide a cutting knife assembly for a combine which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top plan view of a combine header with the cutting knife assembly of this invention mounted thereon;

FIG. 2 is a partial perspective view of the invention;

FIG. 3 is an enlarged sectional view seen along lines 3—3 of FIG. 2;

FIG. 4 is a partial top elevational view of a portion of a modified form of the cutting bar assembly;

FIG. 5 is an enlarged sectional view seen along lines 5—5 of FIG. 4; and

FIG. 6 is a schematic view illustrating the displacement of the crop stem as it is being severed.

The numeral 10 generally designates a conventional combine header assembly including a platform 12, feed auger 14 and feed housing 16 extending upwardly and rearwardly from the platform to the combine threshing cylinder area. Auger 14 includes helical flighting sections 18 and 20 at its opposite ends which are adapted to convey the crop on the platform to the center area thereof. Auger 14 includes a plurality of conventional finger elements 22 at its center area which are adapted to feed the crop rearwardly into the feed housing 16.

A pair of opposing cutting knife assemblies 24 and 26 are operatively mounted on the forward end of the platform forwardly of the flighting sections 18 and 20 respectively. Assembly 24 comprises a pair of sprockets 28 and 30 which are operatively rotatably mounted about a substantially vertical axis on the platform as seen in FIG. 1. An endless chain 32 extends around and between the sprockets 28 and 30 and is comprised of a plurality of chain links 34. The forward end of the platform is provided with a chain bar guide plate 36 having a groove 38 formed therein in which the chain travels as illustrated in FIG. 3. The guide plate 36 is also provided with a forwardly extending shoulder portion 40 which is partially received between the upper and lower portions of the chain link plates to prevent undesirable vertical movement of the chain as illustrated in FIG. 3.

A plurality of knives 42 are secured on the chain links 32 in a spaced apart manner as seen in FIG. 2 and take the place of the chain link side plate. As seen in FIG. 2, each of the knives 42 include a cutting edge 44. Ledger 46 comprises a base portion 48 which is secured to spacer plate 50 and to the guide plate 36 and has a plurality of spaced apart ledger elements 52 extending forwardly therefrom as illustrated in FIGS. 2 and 3. Each of the ledger elements 52 include a tapered and beveled ledger edge 54 and a forwardly extending finger portion 56. The chain 32 is driven by any convenient means and moves in the direction indicated by the arrow in FIG. 1 so that the knives move outwardly towards the outer end of the platform as the knives sever the crop stems.

The cutting knife assembly 26 is identical to the cutting knife assembly 24 except that the chain thereon is moved in an opposing direction with respect to the chain 30. Further, the relationship of the cutting knives and counter-edges on the cutting knife assembly 26 is opposite to that of cutting knife assembly 24. A divider means 58 is provided between the cutting knife assemblies 24 and 26 to insure that the crop stems will be fed to the operative portion of the assemblies.

FIGS. 4 and 5 illustrate a modified form of the cutting knife assembly 24. As seen in FIGS. 4 and 5, the assembly does not have a ledger means thereon but has a serrated lower counter-edge 60 provided below the knives 62 secured to the chain 32. As seen in FIG. 4, each of the knives 62 have a cutting edge 64 which is adapted to pass over the spaced apart edge portions 66 of the counter-edge 60. As best seen in FIG. 4, the cutting edge 64 and edge portion 66 are disposed so as to define an acute angle which will be varied depending upon the particular crop to be harvested, A knife cover and hold down plate 68 extends over the rearward portion of the knives.

In operation, the combine is operated in the field in conventional fashion and would usually include a reel means (not shown) mounted on the platform to aid in feeding the crop onto the platform. The cutting knife assemblies 24 and 26 are operated in opposing directions as indicated by the arrows in FIG. 1. The operation of cutting knife assembly 24 is as follows. As the combine is moved through the field, the crop is received in the openings 70 and the configuration of the openings is such that the crop stems remain substantially vertical until such time as they are severed by the knives 42. The severance of the stems by the action of the knives 42 and the ledger elements 46 causes the lower end of the stems 72 to be displaced outwardly towards the outer end of the cutting knife assembly 24 due to the impact of the knives with the stem. The cutting phenomena is illustrated in FIG. 6 and it can be seen that the impact of the knives against the crop stem causes the bottom of the stem to be displaced in the same direction as the knives travel so that after severance, the stem is inclined towards the center of the header assembly in the same direction as the flighting section disposed therebehind. In FIG. 6, the numeral 74 designates the center of gravity of the crop stem. The cutting knife assembly 26 likewise orients the crop but in a manner opposite to that of cutting knife assembly 24. The cutting knife assemblies 24 and 26 sever the crop stems and cause the stems severed thereby to be inclined inwardly toward the center of the header in the same direction as the auger feed. The opposing cutting knife assemblies orient the stems in a manner corresponding to the flighting sections immediately therebehind so that the flighting sections can more efficiently and uniformly feed the crop to the center of the platform. The uniform feeding action of the auger to the center of the header permits the combine to achieve improved threshing and separating characteristics due to a more uniform and regular orientation of the crop passing through the combine from the header. The cutting assembly disclosed herein eliminates shattering of the crop and also eliminates the crop from being "second-cut," by virtue of higher knife speed, knife orientation and ledger design.

The elements 46 and 60 may or may not be necessary according to the particular crop conditions encountered. It has been found that either of the elements 46 and 60 may be utilized and that both of the elements may be omitted depending on crop conditions. When utilized, the elements 46 and 60 provide the stalk or stem with resistance to sideward deflection during the cutting operation. Without elements 46 and 60, the cutting action is achieved due to the impact of the knives with the standing crop stems.

While the knives 42 have been described as being attached to a chain, it should be fully understood that the chain is merely one means for supporting the knives and it is possible to substitute a continuous belt or the like for the chain. Thus it can be seen that the opposing cutting knife assemblies of this invention cause the severed crop stems to be oriented so that the crop is in a more favorable position to be cross conveyed by the feed auger. The opposing cutting knife assemblies of this invention also insure that the crop stems will be efficiently severed so that the stems are conveyed onto the platform rather than away from the same. The assembly of this invention reduces grain loss and improves the threshing and separating characteristics of the combine. Thus it can be seen that the invention accomplishes at least all of its stated objectives.

We claim:

1. In combination with a combine header assembly including an elongated platform, an auger means horizontally rotatably mounted on said platform and having first and second helical flighting sections extending inwardly from its ends adapted to convey the cut crop towards the center of the platform, comprising, a first endless cutting means mounted on said platform forwardly of said first helical flight section and parallel thereto, a second endless cutting means mounted on said platform forwardly of said second helical flight section and parallel thereto, and means for moving said first and second cutting means in opposite directions, so that the first and second cutting means move away from the center of said platform as the cutting means cut the standing crop whereby the crop stems will be oriented with respect to the flighting sections so that the stems will be inclined towards the center of the platform in the same direction as the auger feed.

2. The combination of claim 1 wherein first and second counter-edge means are mounted on said platform forwardly of said first and second flighting sections, said first and second endless cutting means cooperating with said first and second counter-edge means respectively to effect the cutting of the crop.

3. The combination of claim 2 wherein each of said counter-edge means comprises a plate means extending beneath said cutting means, said plate means having a plurality of spaced apart openings formed therein.

4. The combination of claim 1 wherein each of said cutting means comprises a link chain means and cutting elements being detachably secured to said chain means.

5. The combination of claim 4 wherein each of said cutting elements have a tapered cutting edge formed on the operative leading edge thereof so that the lower end of a severed crop stem will be propelled laterally outwardly with respect to the platform means thereby causing the upper end of the severed crop stem to be propelled laterally inwardly with respect to the platform means.

6. The combination of claim 1 wherein a crop divider means is secured to said platform between said first and second cutting means.

7. The combination of claim 1 wherein first and second ledger means are mounted on said platform forwardly of said first and second flighting sections, said first and second endless cutting means cooperating with said first and second ledger means respectively to effect the cutting of the crop.

8. The combination of claim 7 wherein each of said ledger means comprises a plurality of spaced apart ledger edge portions disposed above said cutting means.

9. The combination of claim 8 wherein each of said ledger edge portions are angularly disposed with respect to the direction of travel of said cutting means, said cutting means comprising a plurality of spaced apart cutting knives, each of said knives having a cutting edge thereon which is angularly disposed with respect to said ledger edge portions.

* * * * *